(12) United States Patent
Yoshizaki (10) Patent No.: US 11,180,090 B2
(45) Date of Patent: Nov. 23, 2021

(54) APPARATUS AND METHOD FOR CAMERA VIEW SELECTION/SUGGESTION

(71) Applicant: TOYOTA MOTOR ENGINEERING & MANUFACTURING NORTH AMERICA, INC., Plano, TX (US)

(72) Inventor: Coh L. Yoshizaki, Wixom, MI (US)

(73) Assignee: TOYOTA MOTOR ENGINEERING & MANUFACTURING NORTH AMERICA, INC., Plano, TX (US)

( * ) Notice: Subject to any disclaimer, the term of this patent is extended or adjusted under 35 U.S.C. 154(b) by 0 days.

(21) Appl. No.: 16/743,883

(22) Filed: Jan. 15, 2020

(65) Prior Publication Data

US 2021/0213889 A1    Jul. 15, 2021

(51) Int. Cl.
*H04N 7/18* (2006.01)
*B60R 11/04* (2006.01)
*H04N 5/225* (2006.01)

(52) U.S. Cl.
CPC .......... *B60R 11/04* (2013.01); *H04N 5/2257* (2013.01); *B60R 2300/10* (2013.01)

(58) Field of Classification Search
CPC ............... B60R 1/00; B60R 2300/802; B60R 2300/105; B60R 2300/302; B60R 2300/804; B60R 11/04; B60R 2300/605; B60R 2300/607; B60R 2300/8066; B60R 2300/70
USPC ..................................................... 348/148
See application file for complete search history.

(56) References Cited

U.S. PATENT DOCUMENTS

| | | | |
|---|---|---|---|
| 6,690,268 B2 | 2/2004 | Schofield et al. | |
| 8,004,394 B2 | 8/2011 | Englander | |
| 8,339,253 B2 | 12/2012 | Chundrlik, Jr. et al. | |
| 9,043,483 B2 | 5/2015 | Grigsby et al. | |
| 9,428,186 B2 | 8/2016 | Breed | |
| 9,429,816 B2 | 8/2016 | Augst | |
| 9,802,538 B2 | 10/2017 | Augst | |
| 10,230,877 B2 | 3/2019 | Yuen et al. | |
| 2003/0137586 A1* | 7/2003 | Lewellen | H04N 7/181 348/148 |
| 2005/0240342 A1* | 10/2005 | Ishihara | G08G 1/167 701/1 |

(Continued)

FOREIGN PATENT DOCUMENTS

| | | |
|---|---|---|
| JP | 2005117424 A | 4/2005 |
| WO | WO201934916 A1 | 2/2019 |
| WO | WO201952739 A1 | 3/2019 |

*Primary Examiner* — Gims S Philippe
(74) *Attorney, Agent, or Firm* — Oblon, McClelland, Maier & Neustadt, L.L.P.

(57) ABSTRACT

An apparatus and a method for camera view selection for a first vehicle are provided. The apparatus can include camera modules and processing circuitry. The camera modules are configured to use first camera views to show a surrounding environment of the first vehicle. The processing circuitry can obtain view selection information that indicates at least one of: one or more reference camera views and road information for the first vehicle. The processing circuitry can determine, based on the view selection information, a candidate camera view for the first vehicle from the first camera views and select one of the first camera views for a user of the first vehicle based on at least one of the candidate camera view and a user preference.

20 Claims, 6 Drawing Sheets

(56) References Cited

U.S. PATENT DOCUMENTS

| | | |
|---|---|---|
| 2015/0286880 A1* | 10/2015 | Itou ................. B60L 53/38 |
| | | 348/148 |
| 2016/0379411 A1 | 12/2016 | Harbach et al. |
| 2017/0083771 A1 | 3/2017 | Clark |
| 2017/0101056 A1 | 4/2017 | Park |
| 2017/0163863 A1 | 6/2017 | Gomez Timoneda et al. |
| 2017/0327038 A1* | 11/2017 | Karabed ................. G01S 19/13 |
| 2018/0022290 A1 | 1/2018 | Feldman et al. |
| 2018/0031384 A1 | 2/2018 | Lee et al. |
| 2018/0113606 A1 | 4/2018 | Crawford et al. |
| 2018/0336787 A1 | 11/2018 | Ohnishi et al. |
| 2019/0001968 A1* | 1/2019 | Yorifuji ................. B60K 35/00 |
| 2019/0031101 A1 | 1/2019 | Yousefian et al. |
| 2019/0052842 A1 | 2/2019 | Du et al. |
| 2019/0143905 A1* | 5/2019 | Cazzoli ............... G06F 3/04847 |
| | | 348/148 |
| 2019/0164430 A1* | 5/2019 | Nix ................. B60R 1/002 |

* cited by examiner

APPARATUS AND METHOD FOR CAMERA VIEW SELECTION/SUGGESTION

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

A vehicle can be configured to have cameras that can help a driver of the vehicle. In an example, U.S. 20190052842 A1 describes a system and a method for improved obstacle awareness in using a V2X communications system. In particular, the system and method are operative to receive an image from a proximate vehicle and to augment a display within the host vehicle by providing a view of objects with an area of obstructed view.

SUMMARY

According to an embodiment of the present disclosure, an apparatus and a method for camera view selection for a first vehicle are provided. The apparatus can include camera modules and processing circuitry. The camera modules are configured to use first camera views to show a surrounding environment of the first vehicle. The processing circuitry can obtain view selection information that indicates at least one of: one or more reference camera views and road information for the first vehicle. The processing circuitry can determine, based on the view selection information, a candidate camera view for the first vehicle from the first camera views and select one of the first camera views for a user of the first vehicle based on at least one of the candidate camera view and a user preference. In an example, the apparatus can include a display device that is configured to display images captured using the selected one of the first camera views.

In an example, the view selection information further indicates at least one of: a time, a location, a vehicle type, and an event, for which each of the one or more reference camera views is used. The one or more reference camera views can include a second camera view used by a second vehicle that is different from the first vehicle.

In an example, the at least one of the candidate camera view and the user preference is the candidate camera view and the selected one of the first camera views is the candidate camera view.

In an example, the apparatus can include interface circuitry that can output the candidate camera view to the user. The processing circuitry can determine, based on the user preference, the one of the first camera views.

In an example, the one or more reference camera views include a previous camera view used by the user, the previous camera view being available to a previous vehicle. The view selection information further indicates at least one of: a time, a location, a vehicle type, and an event, for which the previous camera view is used.

In an example, the processing circuitry can identify the user from multiple users.

In an example, the first camera views are configured to show different portions and/or different field of views of a surrounding environment of the first vehicle.

In an example, the view selection information indicates that the road information is associated with at least one of: an accident, a criminal event, a school event, a construction, a celebration, and a sport event.

According to an embodiment of the present disclosure, there is provided a non-transitory computer readable storage medium having instructions stored thereon that when executed by processing circuitry causes the processing circuitry to perform the method.

BRIEF DESCRIPTION OF THE DRAWINGS

Various embodiments of this disclosure that are proposed as examples will be described in detail with reference to the following figures, wherein like numerals reference like elements, and wherein.

DETAILED DESCRIPTION

An apparatus can include camera modules that are configured to have respective first camera views that can, for example, show a surrounding environment of a first vehicle. The apparatus can include processing circuitry that is configured to obtain view selection information. The view selection information can indicate reference camera view(s). The reference camera view(s) can include second camera view(s) used by second vehicle(s) that are different from the first vehicle. The reference camera view(s) can include previous camera view(s) used by the first vehicle and/or by a user of the first vehicle. The view selection information can further indicate a driving scenario (also referred to as a reference driving scenario) (e.g., a time, a location, one or more events) and/or vehicle characteristic(s) (e.g., a vehicle type) for each of the reference camera view(s). The view selection information can indicate road information for the first vehicle 101. The road information can be associated with event(s), such as an accident, a criminal event, a school event, a construction, a celebration, a sport event, and/or the like. The processing circuitry can be configured to determine, based on the view selection information, candidate camera view(s) for the first vehicle from the first camera views. Further, the processing circuitry can be configured to select one of the first camera views for the user of the first vehicle based on at least one of the candidate camera view(s) and a user preference. The apparatus can further include a display device configured to display images and/or videos captured using the selected one of the first camera views.

In an example, the processing circuitry can be configured to determine the candidate camera view(s) based on the view selection information, a movement (e.g., a left turn, a reverse) of the first vehicle, and/or a user preference of the user of the first vehicle. The first vehicle can be any suitable vehicle that can move, such as a car, a cart, a train, or the like.

Figure 1:
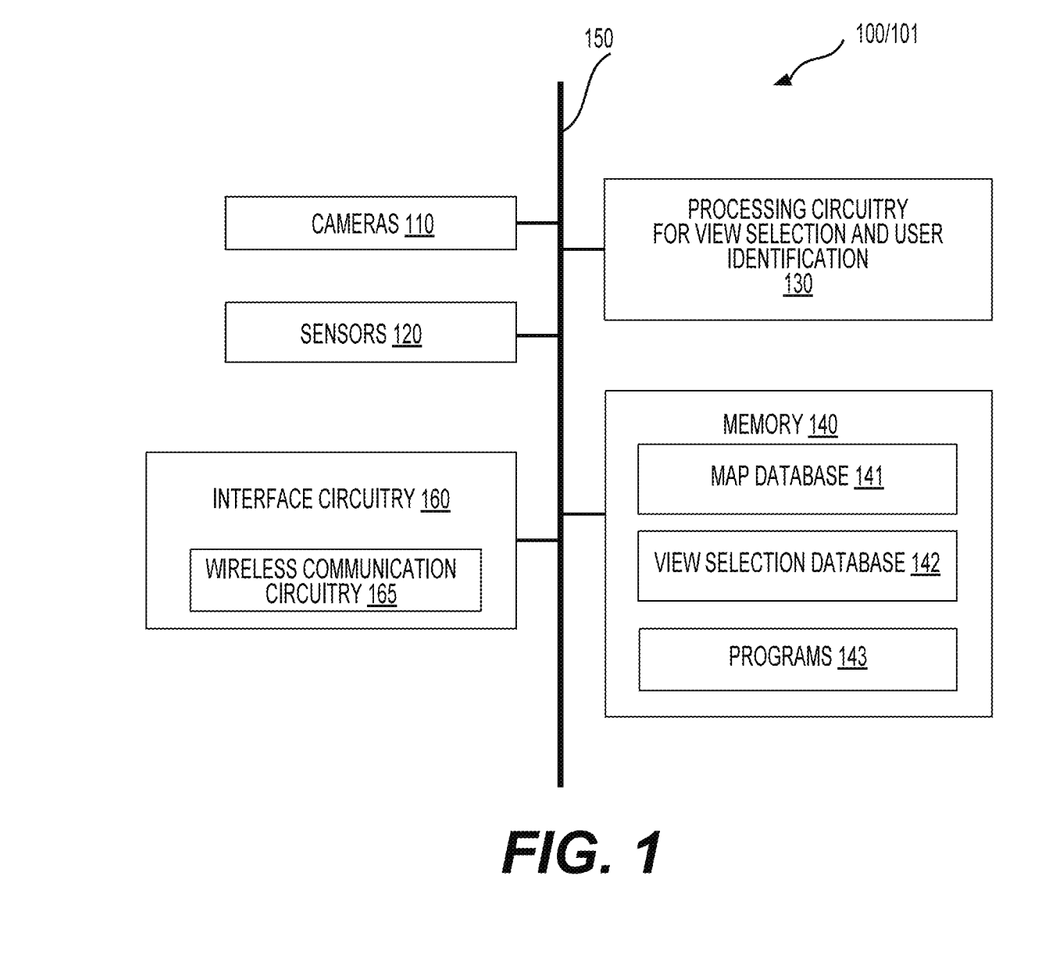
FIG. 1 is a schematic of an exemplary apparatus according to an embodiment of the disclosure.

FIG. 1 is a schematic of an exemplary apparatus 100 according to an embodiment of the disclosure. The apparatus 100 can include camera modules 110, sensors 120, interface circuitry 160, processing circuitry 130, and memory 140 that are coupled together, for example, using a bus 150. In an example, such as shown in FIG. 1, the apparatus 100 is a part of the first vehicle 101. Alternatively, certain components (e.g., the camera modules 110) of the apparatus 100 can be located in the first vehicle 101 and certain components (e.g., processing circuitry 130) of the apparatus 100 can be located remotely in a server, a cloud, or the like that can communicate with the first vehicle 101 wirelessly.

The camera modules 110 can be any suitable devices that can obtain images or videos. The camera modules 110 can capture different views around the first vehicle 101. The camera modules 110 can be fixed to the first vehicle 101. The camera modules 110 can be detachable, for example, the camera modules 110 can be attached to, removed from, and then reattached to the first vehicle 101. The camera modules 110 can be positioned at any suitable locations of the first vehicle 101. The camera modules 110 can be oriented toward any suitable directions. Accordingly, the camera modules 110 can obtain images or videos using first camera views that are configured to show different portions of the surrounding environment of the first vehicle 101. The different portions of the surrounding environment can include a front portion that is in front of the first vehicle 101, a rear portion that is behind the first vehicle 101, a right portion that is to the right of the first vehicle 101, a left portion that is to the left of the first vehicle 101, a bottom portion that shows an under view of the first vehicle 101, a top portion that is above the first vehicle 101, and/or the like. Accordingly, a front view, a rear view, a left view, a right view, a bottom view, and a top view can show the front portion, the rear portion, the left portion, the right portion, the bottom portion, and the top portion of the surrounding environment, respectively. For example, the bottom view can show a tire, a pothole beneath the first vehicle 101, or the like. Different portions, such as the left portion and the bottom portion, can overlap. Additional views (e.g., a right-front view, a top-left view) can be obtained by adjusting an orientation of a camera module, by combining multiple camera views, and thus show corresponding portions of the surrounding environment. An orientation of a camera module can be adjusted such that the camera module can show different portions using different orientations.

Each of the camera modules 110 can be configured to have one or more field of views (FOVs) of the surrounding environment, for example, by adjusting a focal length of the respective camera module 110 or by including multiple cameras having different FOVs in the camera module 110. Accordingly, the first camera views can include multiple FOVs of the surrounding environment.

In general, the first camera views can include different views and/or different FOVs of the surrounding environment. In an example, the first camera views include the front view, the right-front view, the front bird-eye view (i.e., the front view with the bird-eye FOV), the normal left-front view (i.e., the left-front view with the normal FOV), and/or the like.

Different vehicles can have different camera views. For example, a vehicle A may have a normal rear view (e.g., a rear view with the normal FOV) and a wide rear view (e.g., a rear view with the bird-eye FOV). A vehicle B may only have a normal rear view. In an example, certain standardization, for example, by the International Organization for Standardization (ISO) or Society of Automotive Engineers (SAE) can be used to specify a classification of camera views. The classification for camera views can include a front view, a rear view, a side view, a bird eye view, and/or the like. The classification can also be detailed, for example, including a normal rear view, a wide rear view, and/or the like.

Figure 2A:
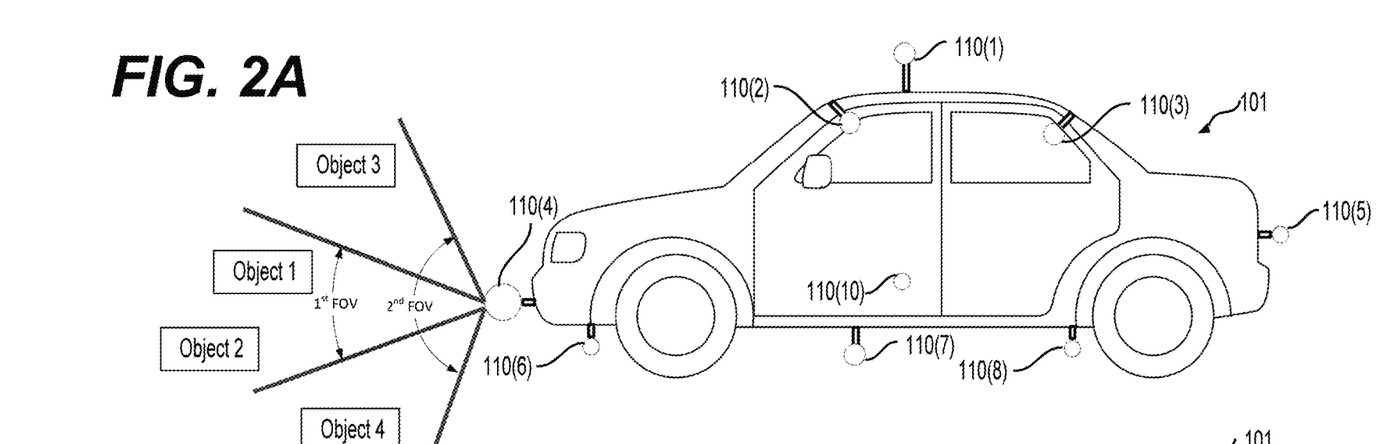
FIGS. 2A-2B show examples of camera modules according to an embodiment of the disclosure.
Figure 2B:
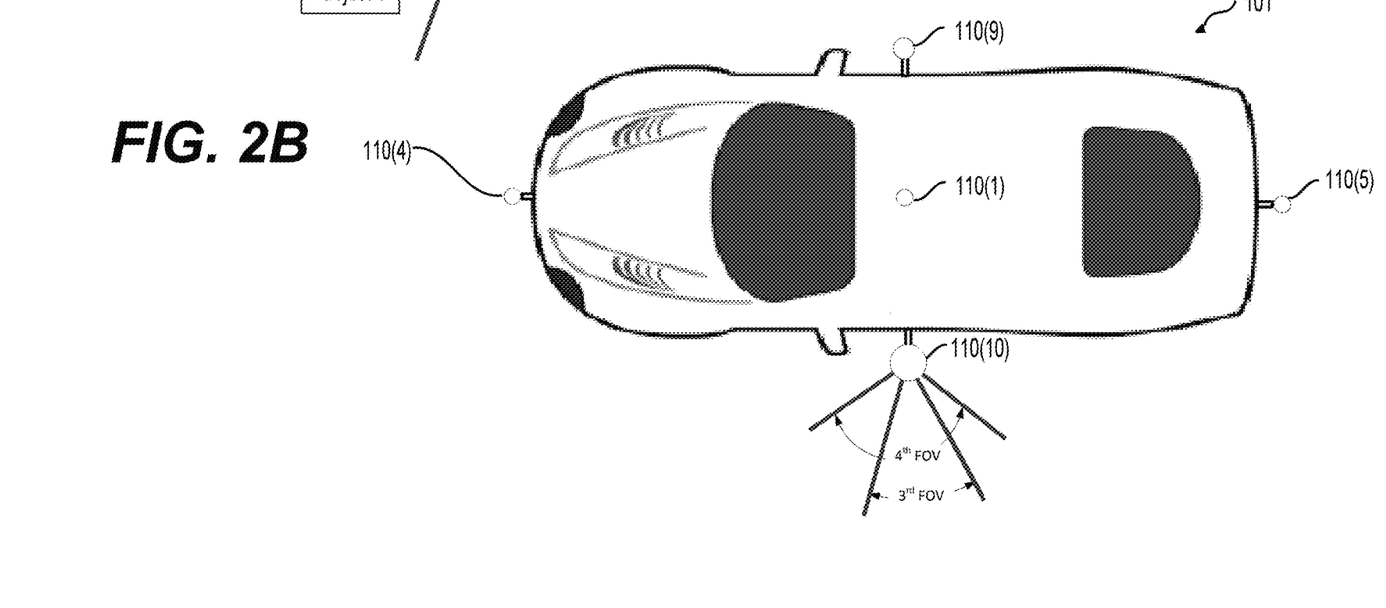

FIGS. 2A-2B show examples of the camera modules 110 (e.g., the camera modules 110(1)-(10)) according to an embodiment of the disclosure. For example, the camera module 110(1) is positioned on a top side of the first vehicle 101. The camera modules 110(2)-(3) are positioned on a left side of the first vehicle 101 where the camera module 110(2) is near a front end of the first vehicle 101 and the camera module 110(3) is near a rear end of the first vehicle 101. The camera module 110(4) is positioned on the front end of the first vehicle 101 where the camera module 110(5) is positioned at the rear end of the first vehicle 101. The camera modules 110(6)-(8) are positioned on a bottom side of the first vehicle 101. The camera modules 110(9)-(10) are positioned on the left side and a right side of the first vehicle 101, respectively.

In an example, the camera module 110(4) is oriented such that the camera module 110(4) can obtain images or videos of the front portion of the surrounding environment. Further, the camera module 110(4) can be configured to have multiple FOVs, for example, a first FOV and a second FOV. The first FOV and the second FOV correspond to a first solid angle and a second solid angle and the second FOV is larger than the first FOV (i.e., the second solid angle is larger than the first solid angle). In an example, the second FOV includes the first FOV. When the camera module 110(4) is configured to have the first FOV, objects (e.g., objects 1-2) within the first FOV or the first solid angle can be captured by the camera module 110(4) and objects (e.g., objects 3-4) outside the first FOV cannot be captured by the camera module 110(4). When the camera module 110(4) is configured to have the second FOV, the objects (e.g., the objects 1-4) within the second FOV or the second solid angle can be captured by the camera module 110(4).

The descriptions related to the camera module 110(4) can be suitably adapted to other camera modules. For example, the camera module 110(10) is oriented such that the camera module 110(10) can obtain images or videos of the left portion of the surrounding environment. Further, the camera module 110(10) can be configured to have a third FOV and a fourth FOV. The third FOV and the fourth FOV correspond to a third solid angle and a fourth solid angle and the fourth FOV is larger than the third FOV. In an example, the fourth FOV includes the third FOV. When the camera module 110(10) is configured to have the third FOV, objects within the third FOV can be captured by the camera module 110(10). When the camera module 110(10) is configured to have the fourth FOV, objects within the fourth FOV can be captured by the camera module 110(10). In an example, the second and fourth FOVs are referred to as bird eye views and the first and third FOVs are referred to as normal views. In an example, the bird eye view can be approximately 180°.

In general, the surrounding environment of the first vehicle 101 can include road conditions, lane markers, road signs, traffic signs, objects including, for example, vehicles, pedestrians, obstacles, on or close to the roads, and the like. The first camera views can show traffic sign(s) and/or road signs (e.g., for re-routing during an event, such as a marathon), potential hazardous objects such as a pothole, accident debris, a roadkill, and/or the like. In an embodiment, an event occurs near the first vehicle 101, certain camera view(s) can be used to show certain portion(s) of the surrounding environment of the first vehicle 101. For example, the event is a marathon and roads are rerouted, and thus a bird-eye camera view is used to capture more traffic sign(s) for rerouting to help the user of the first vehicle 101. Event(s) can include a recurring event such as a school drop-off and/or pick-up in a school zone, a bus drop-off and/or pick-up at a bus stop along a bus route, a railroad crossing.

The sensors 120 can include any suitable devices that can detect user characteristic(s) (e.g., a face, weight information, a finger print, a voice, a seat selection, a personal portal device) of the user of the first vehicle 101. In an embodiment, the sensors 110 can include camera module(s) (e.g., an internal camera inside the first vehicle 101) configured to obtain images of the face of the user, for example, for face recognition, weight sensor(s) configured to determine the weight information of the user, finger print sensor(s) configured to obtain one or more finger prints of the user, seat selection information configured to determine the seat selection of the user, a voice detector, for example, including a microphone that is configured to detect the voice of the user, a communication device that is configured to detect the personal portal device (e.g., a smartphone) associated with the user, and/or the like. For example, the communication device can be a Bluetooth device. The user can be determined by pairing the smartphone of the user with the Bluetooth device. The sensors 120 can also detect a key associated with the user. The sensors 120 can be detachable from the first vehicle 101. The sensors 120 can be attached to the first vehicle 101.

The interface circuitry 160 can be configured to communicate with any suitable device or the user of the first vehicle 101 using any suitable devices and/or communication technologies, such as wired, wireless, fiber optic communication technologies, and any suitable combination thereof. The interface circuitry 160 can include wireless communication circuitry 165 that is configured to receive and transmit data wirelessly from server(s) (e.g., a dedicated server, a cloud including multiple servers), vehicle(s) (e.g., using vehicle-to-vehicle (V2V) communication), infrastructure(s) (e.g., using vehicle-to-infrastructure (V2I) communication), one or more third-parties (e.g., a municipality), map data service(s), and/or the like. The map data service(s) can provide any suitable data, such as map data. The map data can also include real time information indicating, for example, real time traffic and road condition. In an example, the wireless communication circuitry 165 can communicate with mobile devices including a mobile phone via any suitable wireless technologies such as IEEE 802.15.1 or Bluetooth. In an example, the wireless communication circuitry 165 can use wireless technologies, such as IEEE 802.15.1 or Bluetooth, IEEE 802.11 or Wi-Fi, mobile network technologies including such as global system for mobile communication (GSM), universal mobile telecommunications system (UMTS), long-term evolution (LTE), fifth generation mobile network technology (5G) including ultra-reliable and low latency communication (URLLC), and the like.

The interface circuitry 160 can include any suitable individual device or any suitable integration of multiple devices such as touch screens, keyboards, keypads, a mouse, joysticks, microphones, universal series bus (USB) interfaces, optical disk drives, display devices, audio devices (e.g., speakers), and the like. The display device can be configured to display images/videos captured by one of the camera modules 110 using the respective first camera view.

The interface circuitry 160 can also include a controller that convert data into electrical signals and send the electrical signals to the processing circuitry 130. The interface circuitry 160 can also include a controller that convert electrical signals from the processing circuitry 130 to the data, such as visual signals including text messages used by a display device, audio signals used by a speaker, and the like. For example, the interface circuitry 160 can be configured to output an image on an interactive screen and to receive data generated by a stylus interacting with the interactive screen.

The interface circuitry 160 can be configured to output data, such as candidate camera view(s) determined by the processing circuitry 130 to the user of the first vehicle 101, and the like.

The interface circuitry 160 can be configured to receive data, such as the view selection information described above. The view selection information can include or indicate reference camera view(s) used by vehicles, reference driving scenario(s) and/or vehicle characteristic(s) for the respective reference camera view(s), such as time(s), location(s), vehicle type(s), and event(s), for which the respective camera views are used. In an example, the vehicles (e.g., the second vehicle(s)) are different from the first vehicle 101, and the reference camera view(s) are second camera view(s). In an example, the reference camera views include first previous camera view(s) used by the first vehicle 101. In an example, the reference camera views include second previous camera view(s) used by the user of the first vehicle 101, and the user can use the second previous camera view(s) when using the first vehicle 101 or another vehicle. The view selection information can also indicate or include road information of certain events (e.g., an accident, a criminal event, a school event, a construction, a celebration, a sport event,) for the first vehicle 101. For example, the events can occur in or in close proximity (e.g., a distance between the first vehicle 101 and the event is within a certain distance threshold) of the first vehicle 101.

The interface circuitry 160 can be configured to receive routing data for routing the first vehicle 101. In an example, the interface circuitry 160 can receive positioning information from various satellite-based positioning systems such as a global positioning system (GPS), and determine a position of the first vehicle 101. In some examples, the position can be a physical address, the latitude and longitude coordinates of a geographic coordinate system used by satellite-based positioning systems such as a GPS, and the like.

The interface circuitry 160 can receive user identification information, for example, interactively. In an example, the interface circuitry 160 can output inquires, such as questions and the like related to a user identity. The interface circuitry 160 can be configured to receive data related to the inquiries.

The interface circuitry 160 can receive a user preference of the user of the first vehicle 101. The user preference can indicate a camera view selection history of the user. For example, the camera view selection history may indicate a user preference for the bird eye view instead of the normal view. The camera view selection history may indicate a user habit where the user ignores camera views suggested to the user more frequently than uses the suggested camera views.

The interface circuitry 160 can output the candidate camera view(s) determined by the processing circuitry 130 to the user of the first vehicle 101. The interface circuitry 160 can receive an input from the user indicating a user selection. The user can select one or more of the candidate camera view(s) via the interface circuitry 160. Alternatively, the user can select none of the candidate camera view(s) and indicate camera view(s) selected by the user via the interface circuitry 160.

The first camera views can be obtained by the processing circuitry 130, for example, from the camera modules 110, the memory 140, the interface circuitry 160, and/or the like.

The processing circuitry 130 can be configured to obtain the view selection information and determine, based on the view selection information, the candidate camera view(s) for the first vehicle 101 from the first camera views available to show the surrounding environment of the first vehicle 101. The candidate camera view(s) can be camera views included in the view selection information. For example, the view selection information includes "a wide rear view" and the candidate camera view(s) is "a wide rear view". Alternatively, the candidate camera view(s) are not included in the view selection information. For example, the view selection information includes "a wide rear view", "a front view", and "a side view", the first vehicle 101 is not configured to have the bird-eye view. Accordingly, the candidate camera view(s) is "a rear view" that can be an optimal match of the "wide rear view" in the view selection information.

In an example, the first vehicle 101 is at a current location and the processing circuitry 130 determines the candidate camera view(s) to be used at the current location. In an example, the first vehicle 101 is at the current location and the processing circuitry 130 determines the candidate camera view(s) to be used at a next location. When the first vehicle 101 arrives at the next location in a later time, the first vehicle 101 can use the candidate camera view(s).

The processing circuitry 130 can obtain the reference camera view(s) directly or can extract the reference camera view(s) from images, videos, or the like. In an example, the processing circuitry 130 receives image(s) from a vehicle. The image(s) can show a portion of a surrounding environment of the vehicle. The processing circuitry 130 can extract camera view information based on the image(s). For example, the camera view information indicates that a right bird-eye view is used to obtain the image(s), and accordingly the processing circuitry 130 can determine that the reference camera view used by the vehicle is the right bird-eye view.

In a first embodiment, the view selection information indicates multiple second camera views from second vehicle(s) that are different from the first vehicle 101. The multiple second camera views can include a front view, a left view, a bird eye view, a normal view, a front bird eye view, and/or the like used by the second vehicle(s).

The interface circuitry 160 can receive data indicating the multiple second camera views, for example, from the second vehicle(s), from a server configured to collect the data from the second vehicle(s), from a cloud, and/or the like. In an example, the received data include the multiple second camera views, such as a front view, a rear view and the processing circuitry 130 obtains the multiple second camera views from the interface circuitry 160. In an example, the received data include images/videos. The processing circuitry 130 obtains the images/videos, and subsequently determines or extracts the multiple second camera views based on the images/videos.

The second vehicle(s) can be within a certain distance threshold (e.g., 50 meters, 1 mile) from the first vehicle 101. The second vehicle(s) may have been or are in a location where the first vehicle 101 is to be. The second vehicle(s) can be used (e.g., driven) by other users (e.g., drivers). Further, the processing circuitry 130 can determine, based on the multiple second camera views, candidate camera view(s) for the first vehicle 101.

In an example, the view selection information further includes reference driving scenarios and/or vehicle characteristics for the multiple second camera views. A reference driving scenario can include a time, a location, event(s), or the like. A time can refer to a time in a day (e.g., 2:15 pm, morning, afternoon, day time, night time), a time in a year (e.g., spring, winter, June), a suitable combination (e.g., a winter afternoon), and/or the like. A location can refer to a specific location (e.g., indicated by a specific physical address), a type of location with certain characteristic(s) (e.g., a traffic intersection, a corner, a corner with obstacles), an event can refer to any event (e.g., a construction that causes a detour with traffic signs, or potholes on a road, a marathon). For example, a second camera view is used at an intersection having obstacles (e.g., tall trees) and during a marathon that goes through the intersection.

The processing circuitry 130 can determine, based on the multiple second camera views and the reference driving scenarios and/or the vehicle characteristics, the candidate camera view(s) for the first vehicle 101. For example, the processing circuitry 130 can determine a most popular camera view from the multiple second camera views based on one or more of: times, locations, vehicle types, events for which the multiple second camera views are used. Further, the processing circuitry 130 can determine the candidate camera view to be the most popular camera view.

The processing circuitry 130 can determine the candidate camera view(s) based on at least one of: the multiple second camera views, the reference driving scenarios and/or the vehicle characteristics, a user preference (e.g., past user selections of camera views), and a movement of the first vehicle 101.

In a second embodiment, the view selection information includes the first previous camera views (e.g., a front view, a left view, a bird eye view, a normal view, a front bird eye view,) used by the first vehicle 101. The processing circuitry 130 can obtain the first previous camera views, for example, from the memory 140. Further, the processing circuitry 130 can determine, based on the first previous camera views, candidate camera view(s) for the first vehicle 101.

In an example, the view selection information further includes previous driving scenarios and/or first vehicle characteristics for the first previous camera views. Similarly, the processing circuitry 130 can determine, based on the first previous camera views, the previous driving scenarios, and/or the first vehicle characteristics, the candidate camera view(s) for the first vehicle 101. In addition, the processing circuitry 130 can determine the candidate camera view(s) based on road information for the first vehicle 101 and/or a movement (e.g., a left turn, a right turn, a reverse) of the first vehicle 101.

In a third embodiment, the view selection information includes the second previous camera views (e.g., a front view, a left view, a bird eye view, a normal view, a front bird eye view,) used or selected by the user of the first vehicle 101. The second previous camera views can be used by the user when using the first vehicle 101 or another vehicle. The second previous camera views can be obtained from a server, a cloud, the memory 140, and/or the like. Further, the processing circuitry 130 can determine, based on the second previous camera views, candidate camera view(s) for the first vehicle 101.

In an example, the view selection information further includes previous driving scenarios and/or vehicle characteristics for the second previous camera views. The processing circuitry 130 can determine, based on the second previous camera views, the previous driving scenarios, and/or the vehicle characteristics, the candidate camera view(s) for the first vehicle 101. The processing circuitry 130 can determine the candidate camera view(s) based on road information for the first vehicle 101 and/or a movement (e.g., a left turn, a right turn, a reverse) of the first vehicle 101.

In a fourth embodiment, the view selection information includes road information for the first vehicle 101, for example, regarding certain events (e.g., an accident, a criminal event, a school event, a construction, a celebration, a sport event,). The road information can be received from map data service(s), infrastructure(s), one or more third-parties, and/or the like. In an example, a school event includes school drop-off and pick-up events. A celebration or a sport event can be a marathon. Further, the processing circuitry 130 can determine, based on the road information, candidate camera view(s) for the first vehicle 101.

In a fifth embodiment, the view selection information includes at least one of: one or more of the multiple second camera views, one or more of the first previous camera views, one or more of the second previous camera views, driving scenarios and/or the vehicle characteristics for the above camera views, the road information for the first vehicle 101. The processing circuitry 130 can determine, based on the view selection information, candidate camera view(s) for the first vehicle 101. The processing circuitry 130 can also determine the candidate camera view based on the vehicle selection information, the user preference (e.g., the past user selections of camera views), and/or the movement (e.g., a left turn, a right turn, a reverse) of the first vehicle 101.

The processing circuitry 130 can automatically display one or more of the candidate camera view(s), for example, to the user. The processing circuitry 130 can suggest or recommend the candidate camera view(s), for example, to the user.

The processing circuitry 130 can be configured to select one of the first camera views for the user of the first vehicle 101 based on at least one of: the candidate camera view(s) and a user preference.

The processing circuitry 130 can be configured to identify the user of the first vehicle 101 from multiple users, for example, based on user information for the multiple users. In an example, the multiple users are associated with the first vehicle 101, for example, the multiple users are users of the first vehicle 101. In an example, the multiple users can be associated with multiple vehicles that may or may not include the first vehicle 101. The processing circuitry 130 can obtain the user information, for example, from the memory 140, from a server, and/or the like. The user information can indicate past camera view selection histories and/or user preferences for the respective multiple users. The user information can indicate user characteristics (e.g., faces, weight information, finger prints, voices, seat selections, personal portal devices) of the multiple users.

The processing circuitry 130 can be configured to identify the user based on any suitable characteristic(s) of the user, for example, detected by the sensors 120. The processing circuitry 130 can identify the user based on the suitable characteristic(s) of the user and the user information of the multiple users. Alternatively, the interface circuitry 160 can receive an input (e.g., a key, an identification code) from the user indicating an identity of the user.

In an example shown in FIG. 1, the processing circuitry 130 is part of the first vehicle 101. In an example, the processing circuitry 130 can be implemented in a server, a cloud, or the like that is remote from the first vehicle 101. The processing circuitry 130 can determine the candidate camera view(s). Then, the server, the cloud, or the like can communicate wirelessly with the first vehicle 101 regarding the determined candidate camera view(s), or the like.

The memory 140 is configured to store a map database 141 including road maps, a view selection database 142 including the view selection information, a user list including the user information of the multiple users, and programs 143. In one embodiment, information (e.g., the map database 141, the view selection database 142) in the memory 140 can be modified or updated by the processing circuitry 130. The modified information can also be uploaded to a cloud services platform that can provide on-demand delivery of computing power, database storage, and IT resources or shared with other vehicles, for example, using the wireless communication circuitry 165 via V2I and V2V communications, respectively.

The memory 140 can be a non-volatile storage medium. In another embodiment, the memory 140 includes both non-volatile and volatile storage media. In one embodiment, a portion of the memory 140 can be integrated into the processing circuitry 130. The memory 140 can be located remotely and communicate with the processing circuitry 130 via a wireless communication standard using the wireless communication circuitry 165.

In the FIG. 1 example, the components are coupled together by a bus architecture including a bus 150. Other suitable interconnection techniques can also be used.

One or more components of the interface circuitry 160, the processing circuitry 130, and the memory 140 can be made by discrete devices or integrated devices. The circuits for one or more of the interface circuitry 160, the processing circuitry 130, and the memory 140 can be made by discrete circuits, one or more integrated circuits, application-specific integrated circuits (ASICs), and the like. The processing circuitry 130 can also include one or more central processing units (CPUs), one or more graphic processing units (GPUs), dedicated hardware or processors to implement neural networks, and the like.

Figure 3:
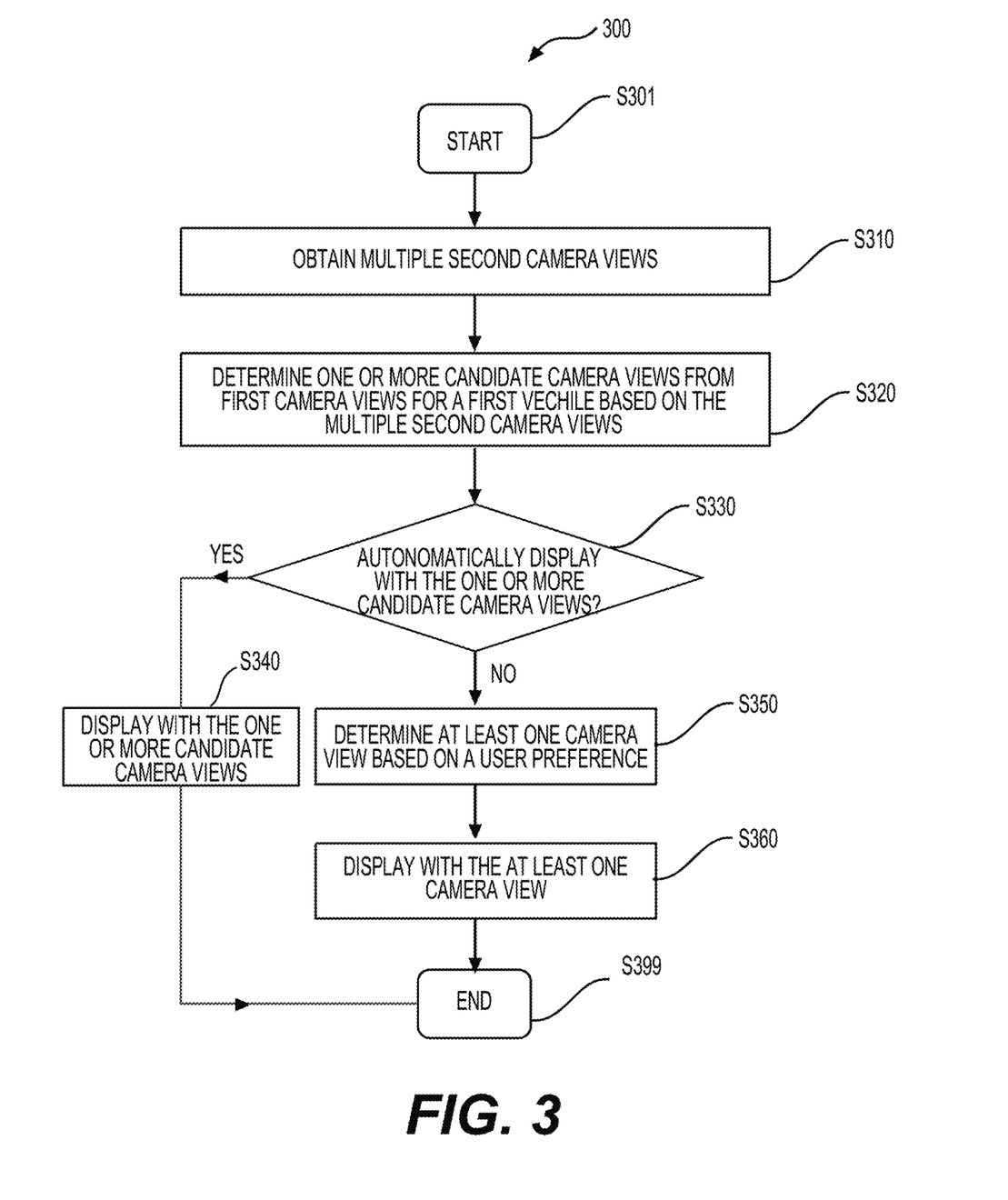
FIG. 3 is a flowchart outlining an exemplary process 300 according to an embodiment of the disclosure.

FIG. 3 is a flowchart outlining an exemplary process 300 according to an embodiment of the disclosure. In an example, the process 300 can be implemented using the apparatus 100 shown in FIG. 1. In an embodiment, the process 300 can be used to determine candidate camera view(s) for a vehicle from camera views available to show a surrounding environment of the vehicle. For purposes of brevity, descriptions are given for the first vehicle 101, and the descriptions can be suitably adapted to any suitable vehicle. As described above, the first vehicle 101 can include the camera modules 110 configured to have the first camera views. The process 300 starts at S301 and proceeds to S310.

At S310, multiple second camera views can be obtained, for example, via the interface circuitry 160, as described above with reference to the first embodiment. The multiple second camera views can be from second vehicle(s) that are different from the first vehicle 101. As described above, the second vehicle(s) can be within the certain distance threshold (e.g., 50 meters, 1 mile) from the first vehicle 101. The second vehicle(s) may have been or are in a first location where the first vehicle 101 is at or will be at. The one or more second vehicles can be used by other users.

In an example, images/videos are received by the interface circuitry 160, and the multiple second camera views are determined by the processing circuitry 130 from the received images/videos.

At S320, one or more candidate camera views from the first camera views can be determined based on the multiple second camera views, for example, by the processing circuitry 130, as described above. Further, the one or more candidate camera views can be determined based on the multiple second camera views and information indicating which of the multiple second camera views are used based on time(s), location(s), vehicle type(s), and event(s) (e.g., construction, a marathon) associated with the multiple second camera views. In an example, the one or more candidate camera views correspond to most popular camera view(s) in the multiple second camera views.

At S330, whether automatically displaying with the one or more candidate camera views is determined, for example, by the processing circuitry 130. When automatically displaying with the one or more candidate camera views is determined, the process 300 proceeds to S340. Otherwise, the process 300 proceeds to S350.

At S340, images and/or videos captured by respective camera module(s) using the respective one or more candidate camera views can be displayed automatically, for example, using respective display devices to the user of the first vehicle 101. The process 300 proceeds to S399 and terminates.

At S350, at least one camera view is determined based on a user preference. The at least one camera view can be determined based on the one or more candidate camera views and the user preference. Weightings can be used for the one or more candidate camera views and the user preference, respectively. In an example, the user preference indicates past view selections by the user. When the user normally ignores recommended camera views (e.g., the one or more candidate camera views) and uses camera views selected by the user, the weighting for the user preference can be set to be larger than the weighting for the one or more candidate camera views, and thus the processing circuitry 130 is biased to the user's selection.

Alternatively, the one or more candidate camera views are recommended to the user, via the interface circuitry 160, and a user selection is received interactively via the interface circuitry 160. The user selection can indicate that the at least one camera view is from the one or more candidate camera views or the at least one camera view is other view(s) from the first camera views where the other view(s) are different from the one or more candidate camera views.

At S360, images and/or videos captured by respective camera module(s) using the at least one camera view can be displayed, for example, using respective display devices to the user of the first vehicle 101. The process 300 proceeds to S399 and terminates.

The process 300 can be suitably modified. Step(s) can be added, omitted, and/or combined. An order of implementing steps in the process 300 can be adapted. In an example, steps S330-S360 can be omitted, and S320 can be modified as below. In addition to using the multiple second camera views, the one or more candidate camera views can be determined based on camera views previously used or selected by the user. For example, if the user normally ignores suggested camera views and uses camera views selected by the user, the one or more candidate camera views can be determined with a bias (e.g., a weighting) toward the camera views previously selected by the user.

Different vehicles can have different camera views available in the respective vehicles. The process 300 can be adapted by receiving classifications of the multiple second camera views and/or often used camera views used by the multiple second vehicles. For example, a second vehicle may have a normal rear view (e.g., a rear view with the normal FOV) and a wide rear view (e.g., a rear view with the bird-eye FOV, a fish eye lens view). The first vehicle may only have a normal rear view which, for example, fulfills Federal Motor Vehicle Safety Standards (FMVSS) requirement. In this case, the second vehicle may send information about a specific camera view used by the second vehicle or the classification (e.g., the second vehicle uses a rear view) to a cloud. The first vehicle may still benefit from the above information because the first vehicle can choose a camera view that is closest to the classification (e.g., the rear view).

Accordingly, the process 300 can be applicable to vehicles from different manufactures with slightly different classification. When the classifications among the different manufactures do not match, the classification of the first vehicle 101 can be used.

The classification for camera views can include a front view, a rear view, a side view, a bird eye view, and/or the like. The classification can also be detailed, for example, including a normal rear view, a wide rear view, and/or the like. The wide rear view can be a 180° view and may be helpful when parking.

When the user of the first vehicle 101 is approaching (or at) a location such as an intersection with a high accident rate (e.g., due to bushes, a corner where views are partially blocked), camera views used by other vehicles that have been at the location or in proximity of the location may be received from a cloud or via V2V, a popular camera view of the camera views may be selected or determined to be displayed for the first vehicle 101. The popular camera view may be a front view with a wide FOV and is beneficial to reveal objects including cars/pedestrians that might be hidden without the wide FOV.

In an example, according to a GPS or any suitable navigation system, a current location of the first vehicle 101 can be determined. A popular camera view used by other vehicles or drivers can be provided, and a suitable camera view that the first vehicle 101 can use at the current location can be selected to be the popular camera view. Alternatively, a location and a corresponding camera view for the location can be determined ahead of time (e.g., via GPS routing), and the camera view can be used when the first vehicle 101 is in proximity of the location or at the location. For example, the first vehicle is at the current location and uses a front view for the current location. The processing circuitry 130 can determine a candidate camera view to be used at a next location, for example, based on camera views that are used by vehicles that are at the next location or have been at the next location. When the first vehicle 101 is within proximity of the next location or reaches the next location, the first vehicle 101 can use the candidate camera view for the next location.

Figure 4:
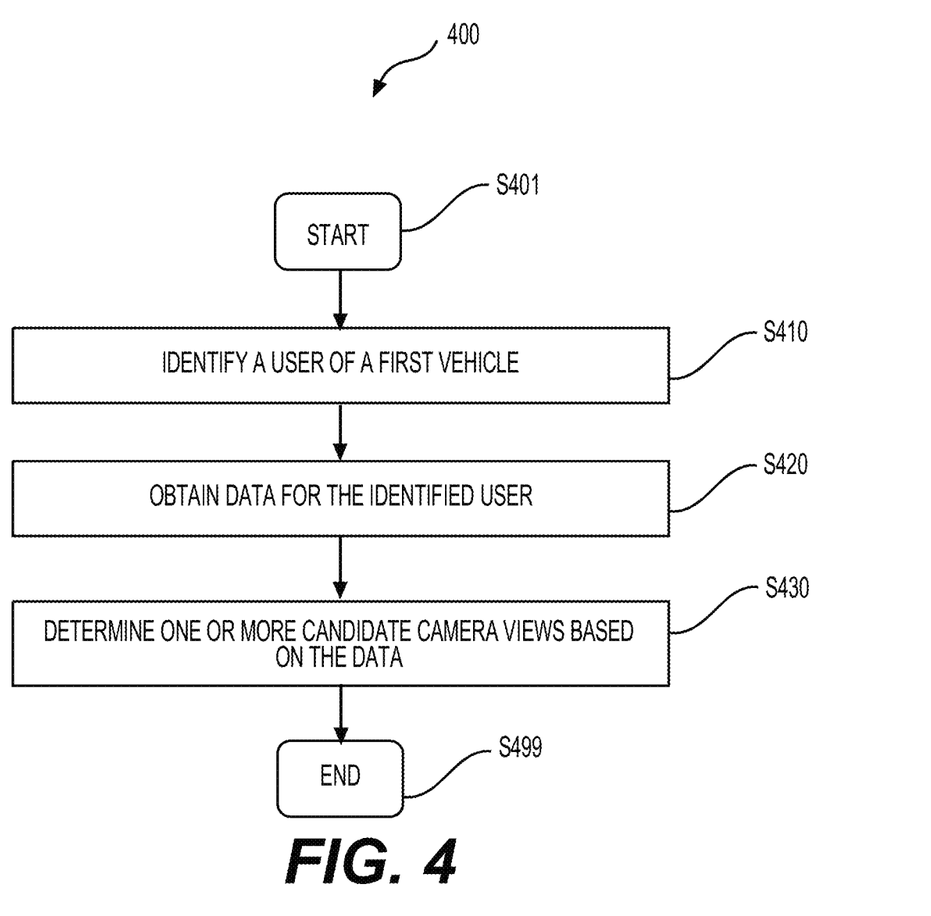
FIG. 4 is a flowchart outlining an exemplary process 400 according to an embodiment of the disclosure.

FIG. 4 is a flowchart outlining an exemplary process 400 according to an embodiment of the disclosure. In an example, the process 400 can be implemented using the apparatus 100 shown in FIG. 1. In an embodiment, the process 400 can be used to determine candidate camera view(s) for a vehicle from camera views available to show a surrounding environment of the vehicle. For purposes of brevity, descriptions are given for the first vehicle 101, and the descriptions can be suitably adapted to any vehicle. As described above, the first vehicle 101 can include the camera modules 110 configured to have the first camera views. The process 400 starts at S401 and proceeds to S410.

At S410, the user of the first vehicle 101 can be identified, for example, based on the user characteristic(s) obtained from the sensor 120, as described above. In an example, a user list having multiple users (e.g., a first user and a second user) and user information of the multiple users can be stored in the memory 140, a cloud, a server, and/or the like. Based on the user characteristic(s) and the user information (e.g., when a face of the user matches with face information of the first user, when a cell phone number of the user matches the first user's phone number stored in the user list), the user of the first vehicle 101 can be determined to be the first user. The multiple users can include users of the first vehicle 101 and/or users of other vehicles. The cloud and/or the server can be specific to a manufacturer, can be shared among multiple manufacturers, or can be a public cloud/server.), the user of the first vehicle 101 can be determined to be the first driver.

At S420, data for the identified user can be obtained. The data can include previous camera view selections of the user where the previous camera view selections indicate previous camera views used by the identified user. The data can further include information indicating which of the previous camera views are used based on time(s), location(s), vehicle type(s), and event(s) associated with the previous camera views. The data can be obtained from the memory 140, a server, a cloud, and/or the like.

At S430, one or more candidate camera views can be determined based on the data for the identified user, for example, by the processing circuitry 130. The process 400 proceeds to S499, and terminates.

The multiple users may or may not have used the first vehicle 101. In an example, the multiple users have not used the first vehicle 101. The identified user is one of the multiple users, indicating that the identified user uses the first vehicle 101 for a first time.

The process 400 can be suitably modified. Step(s) can be added, omitted, and/or combined. An order of implementing steps in the process 400 can be adapted. In an example, a step can be added after S430 to display images/videos obtained using the one or more candidate camera views. In an example, steps similar to S330-S360 are added either to automatically display the images/videos obtained using the one or more candidate camera views or to select at least one camera view based on the one or more candidate camera views and a user reference and then display using the at least one camera view.

Figure 5:
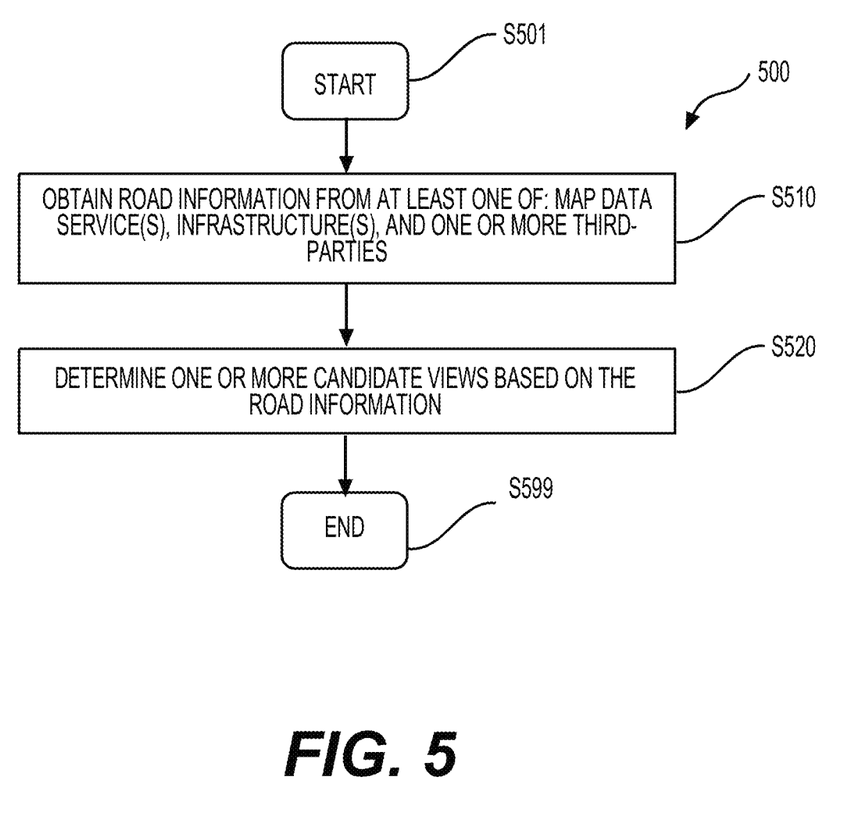
FIG. 5 is a flowchart outlining an exemplary process 500 according to an embodiment of the disclosure.

FIG. 5 is a flowchart outlining an exemplary process 500 according to an embodiment of the disclosure. In an example, the process 500 can be implemented using the apparatus 100 in the first vehicle 101 shown in FIG. 1. Alternatively, the process 500 can be implemented using a server or a cloud and the server or the cloud can communicate with the first vehicle 101. In an embodiment, the process 500 can be used to determine one or more candidate camera views for a vehicle from camera views available to show a surrounding environment of the vehicle. For purposes of brevity, descriptions are given for the first vehicle 101, and the descriptions can be suitably adapted to any vehicle. As described above, the first vehicle 101 can include the camera modules 110 configured to have the first camera views. The process 500 starts at S501 and proceeds to S510.

At S510, road information and/or map data information can be obtained from map data service(s), infrastructure(s) (e.g., a municipality), one or more third-parties, and/or the like. The road information can indicate or include certain events (e.g., an accident, a criminal event, a school event, a construction, a celebration, a sport event,). An event can be a recurring event such as a school zone during school in session time, or bus routes, railroad crossing. In an example, the road information is received from a municipality and indicates which roads are under construction. In general, the road information and/or the map data information can indicate construction(s), criminal event(s), school drop-off and/or pick-up event(s), municipal celebration(s), sport event(s) (e.g., a marathon), and/or accidents.

At S520, one or more candidate camera views can be determined based on the road information (e.g., a type of the construction on the roads) and/or the map data information, for example, by the municipality, a server, a cloud, the processing circuitry 130, or the like. In an example, the map data service(s) and/or the one or more third-parties can suggest or request certain camera view(s) that can help the user of the first vehicle 101. The suggested camera view(s) can be related to the road information, such as the construction, criminal event(s), school drop-off/pick-up events, municipal celebration(s) (e.g., a marathon). In an example, for a recurring event, the one or more candidate camera views can show traffic sign(s), potential hazardous aspects around the vehicle. In an example, re-routing is used in an event, and the one or more candidate camera views can focus on additional road signs for re-routing. The one or more candidate camera views can show a pothole, accident debris, a roadkill, and/or the like. The process 500 proceeds to S599, and terminates.

The process 500 can be suitably modified. Step(s) can be added, omitted, and/or combined. An order of implementing steps in the process 500 can be adapted. In an example, a step can be added after S520 to provide the one or more candidate camera views to the user of the first vehicle 101 as a suggestion. The user can choose to either ignore or accept the one or more candidate camera views. Steps similar to one or more of S330-S360 can be added to automatically display the images/videos obtained using the one or more candidate camera views, to select at least one camera view based on the one or more candidate camera views and a user reference and then display using the at least one camera view, or the like.

In an example, the process 500 is useful regarding constructions. The one or more candidate camera view can provide the user with suitable camera view(s) to minimize damage to the first vehicle 101 and/or to minimize accidents with a piece of construction equipment, a construction worker, or the like.

Figure 6:
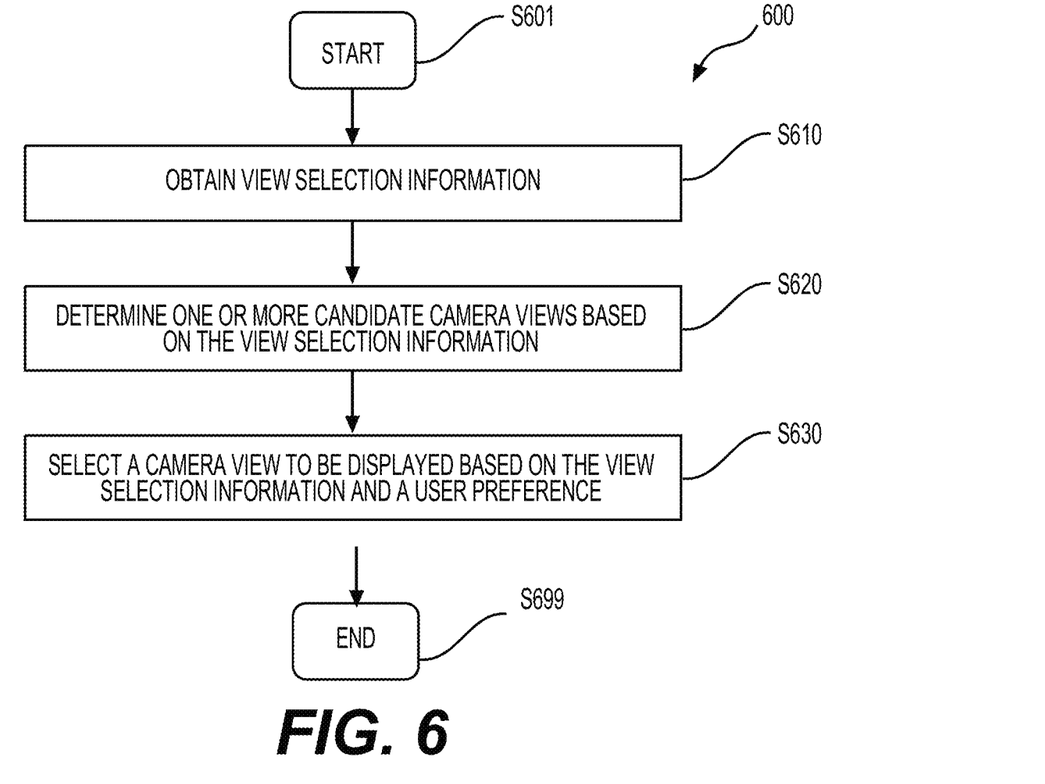
FIG. 6 is a flowchart outlining an exemplary process 600 according to an embodiment of the disclosure.

FIG. 6 is a flowchart outlining an exemplary process 600 according to an embodiment of the disclosure. In an example, the process 600 can be implemented using the apparatus 100 in the first vehicle 101 shown in FIG. 1. In an example, the process 600 can be implemented using a server or a cloud and the server or the cloud can communicate with a vehicle, such as the first vehicle 101, or a user of the vehicle. In an embodiment, the process 500 can be used to determine one or more candidate camera views for the vehicle from camera views available to show a surrounding environment of the vehicle. For purposes of brevity, descriptions are given for the first vehicle 101, and the descriptions can be suitably adapted to any vehicle. As described above, the first vehicle 101 can include the camera modules 110 configured to have the first camera views. The process 600 starts at S601 and proceeds to S610.

At S610, view selection information can be obtained, for example, via the interface circuitry 160, as described above. The view selection information can include at least one of: one or more of the multiple second camera views, one or more of the first previous camera views, one or more of the second previous camera views, driving scenarios and/or vehicle characteristics for the above camera views, the road information for the first vehicle 101.

At S620, one or more candidate camera views for the first vehicle 101 can be determined based on the view selection information. In an example, the one or more candidate camera views can be determined further based on the vehicle selection information, the user preference, and a movement (e.g., a left turn, a right turn, a reverse) of the first vehicle 101.

In an example, the movement and the road information (e.g., a left turn at a corner with obstacles) for the first vehicle 101 can be compared with the driving scenarios and/or the vehicle characteristics for the above camera views in the view selection information. One or more of the camera views that have the matching movement and the road information can be identified. Subsequently, a most popular view (e.g., a front-left bird eye view) can be determined from the one or more of the camera views to be the candidate camera view.

The processing circuitry 130 can also determine a candidate camera view based on a physical address. In an example, the physical address indicates a school pick-up area, the processing circuitry 130 can determine that the candidate camera view(s) are the view(s) that best show the school pick up area.

At S630, one of the first camera views for the user of the first vehicle 101 can be selected based on at least one of: the one or more candidate camera views and a user preference, as described above.

At S640, images and/or videos captured using the selected one of the first camera views can be displayed by a display device. The process 600 proceeds to S699, and terminates.

In an example, S630 and S640 can be implemented by adapting steps S330-360.

While aspects of the present disclosure have been described in conjunction with the specific embodiments thereof that are proposed as examples, alternatives, modifications, and variations to the examples may be made. Accordingly, embodiments as set forth herein are intended to be illustrative and not limiting. There are changes that may be made without departing from the scope of the claims set forth below.

What is claimed is:

1. A method for camera view selection for a first vehicle, comprising:
    obtaining view selection information that indicates one or more reference camera views including a second camera view used by a second vehicle that is different from the first vehicle;
    determining, based on the view selection information that indicates the one or more reference camera views including the second camera view used by the second vehicle that is different from the first vehicle, a candidate camera view for the first vehicle from a plurality of first camera views available to the first vehicle; and
    selecting one of the plurality of first camera views for a user of the first vehicle based on the candidate camera view determined based on the view selection information that indicates the one or more reference camera views including the second camera view used by the second vehicle that is different from the first vehicle and a user preference.

2. The method of claim 1, wherein the view selection information further indicates at least one of a time, a location, a vehicle type, and an event for which each of the one or more reference camera views is used.

3. The method of claim 1, wherein the view selection information further indicates road information for the first vehicle.

4. The method of claim 1, wherein the selected one of the plurality of first camera views is the candidate camera view.

5. The method of claim 1, wherein the selecting the one of the plurality of first camera views further comprises:
    outputting the candidate camera view to the user; and
    determining, based on the user preference, the one of the plurality of first camera views.

6. The method of claim 1, wherein the one or more reference camera views include a previous camera view used by the user, the previous camera view being available to a previous vehicle.

7. The method of claim 6, wherein the view selection information further indicates at least one of a time, a location, a vehicle type, and an event for which the previous camera view is used.

8. The method of claim 6, further comprising identifying the user from multiple users.

9. The method of claim 1, wherein the plurality of first camera views show different portions and/or different field of views of a surrounding environment of the first vehicle.

10. The method of claim 3, wherein the view selection information indicates that the road information is associated with at least one of an accident, a criminal event, a school event, a construction, a celebration, and a sport event.

11. The method of claim 1, further comprising displaying images captured using the selected one of the plurality of first camera views.

12. An apparatus for camera view selection for a first vehicle, comprising:
    camera modules configured to use a plurality of first camera views to show a surrounding environment of the first vehicle; and
    processing circuitry configured to:
    obtain view selection information that indicates one or more reference camera views including a second camera view used by a second vehicle that is different from the first vehicle;
    determine, based on the view selection information that indicates the one or more reference camera views including the second camera view used by the second vehicle that is different from the first vehicle, a candidate camera view for the first vehicle from the plurality of first camera views; and
    select one of the plurality of first camera views for a user of the first vehicle based on the candidate camera view determined based on the view selection information that indicates the one or more reference camera views including the second camera view used by the second vehicle that is different from the first vehicle and a user preference.

13. The apparatus of claim 12, wherein the view selection information further indicates at least one of a time, a location, a vehicle type, and an event for which each of the one or more reference camera views is used.

14. The apparatus of claim 12, wherein the view selection information further indicates road information for the first vehicle.

15. The apparatus of claim 12, wherein the selected one of the plurality of first camera views is the candidate camera view.

16. The apparatus of claim 12, wherein the processing circuitry is further configured to:
    output the candidate camera view to the user; and
    determine, based on the user preference, the one of the plurality of first camera views.

17. The apparatus of claim 12, wherein the one or more reference camera views include a previous camera view used by the user, the previous camera view being available to a previous vehicle.

18. The apparatus of claim 17, wherein the processing circuitry is further configured to identify the user from multiple users.

19. The apparatus of claim 14, wherein the view selection information indicates that the road information is associated with at least one of an accident, a criminal event, a school event, a construction, a celebration, and a sport event.

20. A non-transitory computer readable storage medium having instructions stored thereon that when executed by processing circuitry causes the processing circuitry to perform a method for camera view selection for a first vehicle, the method comprising:
   obtaining view selection information that indicates one or more reference camera views including a second camera view used by a second vehicle that is different from the first vehicle;
   determining, based on the view selection information that indicates the one or more reference camera views including the second camera view used by the second vehicle that is different from the first vehicle, a candidate camera view for the first vehicle from a plurality of first camera views available to the first vehicle; and
   selecting one of the plurality of first camera views for a user of the first vehicle based on the candidate camera view determined based on the view selection information that indicates the one or more reference camera views including the second camera view used by the second vehicle that is different from the first vehicle and a user preference.

* * * * *